US012752343B2

(12) United States Patent
Kurtz et al.

(10) Patent No.: US 12,752,343 B2
(45) Date of Patent: Oct. 6, 2026

(54) DEVICE FOR THE GENERATIVE MANUFACTURING OF COMPONENTS, IN PARTICULAR BY MEANS OF SELECTIVE MELTING OR SINTERING

(71) Applicant: KURTZ GMBH & CO. KG, Kreuzwertheim (DE)

(72) Inventors: Rainer Kurtz, Wertheim (DE); Uwe Rothaug, Marktheidenfeld (DE); Victor Romanov, Wertheim (DE)

(73) Assignee: KURTZ GMBH & CO. KG, Kreuzwertheim (DE)

( * ) Notice: Subject to any disclaimer, the term of this patent is extended or adjusted under 35 U.S.C. 154(b) by 472 days.

(21) Appl. No.: 17/913,788

(22) PCT Filed: Mar. 16, 2021

(86) PCT No.: PCT/EP2021/056738
§ 371 (c)(1),
(2) Date: Sep. 22, 2022

(87) PCT Pub. No.: WO2021/191006
PCT Pub. Date: Sep. 30, 2021

(65) Prior Publication Data

US 2024/0207941 A1 Jun. 27, 2024

(30) Foreign Application Priority Data

Mar. 23, 2020 (DE) ..................... 10 2020 107 925.7
Oct. 23, 2020 (DE) ..................... 10 2020 128 028.9

(51) Int. Cl.
*B22F 12/45* (2021.01)
*B22F 10/73* (2021.01)
(Continued)

(52) U.S. Cl.
CPC .............. *B22F 12/45* (2021.01); *B22F 10/73* (2021.01); *B22F 12/42* (2021.01); *B22F 12/47* (2021.01);
(Continued)

(58) Field of Classification Search
CPC .......... B22F 10/28; B22F 10/36; B22F 10/73; B22F 12/30; B22F 12/41; B22F 12/42;
(Continued)

(56) References Cited

U.S. PATENT DOCUMENTS 5,980,812 A 11/1999 Lawton
9,011,136 B1 4/2015 Uzan et al.
(Continued)

FOREIGN PATENT DOCUMENTS

CN 102380711 A 3/2012
CN 106 312 574 A 1/2017
(Continued)

OTHER PUBLICATIONS

Translation of CN108248022, Zong, Jul. 2018.*
(Continued)

*Primary Examiner* — Philip C Tucker
*Assistant Examiner* — Jimmy R Smith, Jr.
(74) *Attorney, Agent, or Firm* — HoustonHogle LLP

(57) ABSTRACT

The invention refers to a device for generative production of components, in particular by means of selective melting or sintering, comprising a light source for generating a light beam, a processing head that is either coupled to the light source by means of a beam guide, so that the light beam is guided to the processing head, or the light source is arranged directly on the processing head, so that a light beam can be directed from the processing head to a processing area, the processing head being mounted movably, so that the light beam can be directed to any desired location on the pro-
(Continued)

Figure 1:
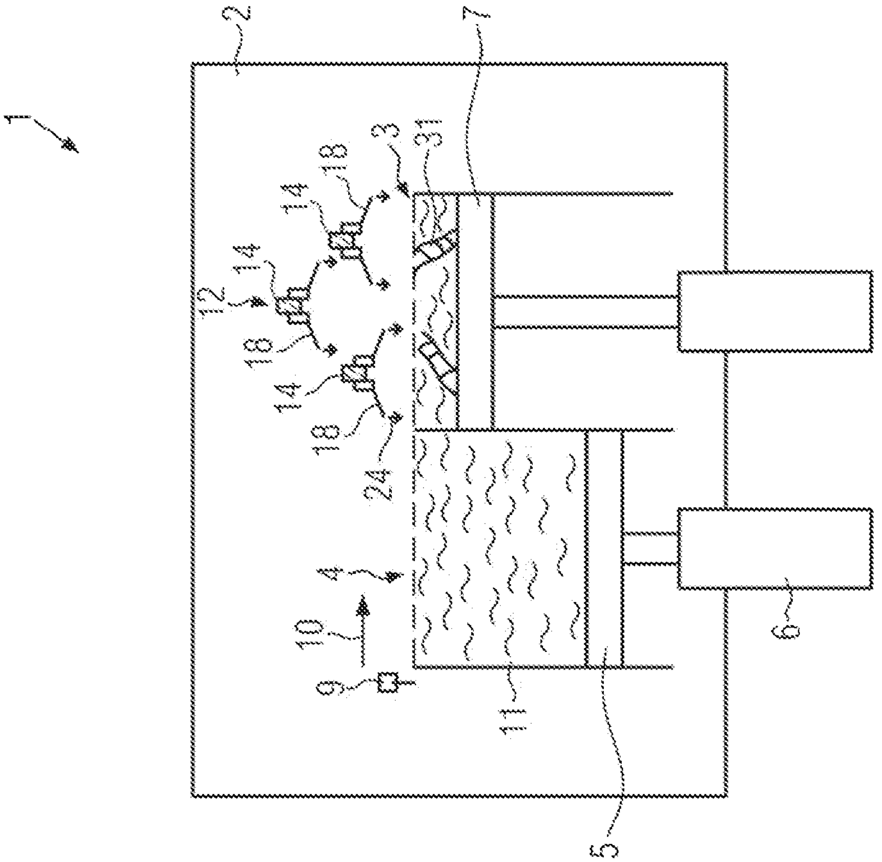

cessing area. The invention is characterized in that several processing heads are provided for the respectively directing a light beam onto the processing area, and the processing heads are each arranged on a carriage that can be moved along a traverse. This allows powder to be melted or sintered simultaneous at several locations. Preferably, the processing heads are arranged on swivel arms. This allows a very simple and cost-effective design of the device.

36 Claims, 11 Drawing Sheets

(51) Int. Cl.

| | |
|---|---|
| ***B22F 12/42*** | (2021.01) |
| ***B22F 12/47*** | (2021.01) |
| ***B22F 12/53*** | (2021.01) |
| ***B22F 12/67*** | (2021.01) |
| ***B22F 12/90*** | (2021.01) |
| ***B33Y 30/00*** | (2015.01) |

(52) U.S. Cl.
CPC .............. *B22F 12/53* (2021.01); *B22F 12/67* (2021.01); *B22F 12/90* (2021.01); *B33Y 30/00* (2014.12)

(58) Field of Classification Search
CPC .......... B22F 12/45; B22F 12/47; B22F 12/53; B22F 12/67; B22F 12/90; B23K 26/342; B29C 64/153; B29C 64/236; B29C 64/241; B29C 64/282; B29C 64/393; B33Y 10/00; B33Y 30/00; B33Y 50/02; Y02P 10/25
See application file for complete search history.

(56) References Cited

U.S. PATENT DOCUMENTS

| | | | | |
|---|---|---|---|---|
| 10,399,145 | B2 | 9/2019 | McMurtry et al. | |
| 10,399,183 | B2 | 9/2019 | Dallarosa et al. | |
| 2014/0077421 | A1 | 3/2014 | Minick | |
| 2014/0198365 | A1 | 7/2014 | Li et al. | |
| 2015/0283612 | A1 | 10/2015 | Maeda et al. | |
| 2017/0129012 | A1 | 5/2017 | Ishida et al. | |
| 2017/0129133 | A1 | 5/2017 | Bolivar | |
| 2017/0217013 | A1 | 8/2017 | Iqtidar et al. | |
| 2018/0065208 | A1* | 3/2018 | Mori .................... | B23K 26/342 |
| 2018/0318926 | A1* | 11/2018 | Woods ............... | B23K 26/0648 |
| 2019/0009333 | A1 | 1/2019 | Fasano | |

FOREIGN PATENT DOCUMENTS

| | | | | | |
|---|---|---|---|---|---|
| CN | 206 065 685 | U | | 4/2017 | |
| CN | 108248022 | A | * | 7/2018 | ............. B33Y 30/00 |
| DE | 10 053 742 | A1 | | 5/2002 | |
| DE | 10235427 | A1 | | 2/2004 | |
| DE | 10 053 742 | C5 | | 6/2006 | |
| DE | 10 2013 215748 | A1 | | 2/2015 | |
| DE | 10 2013 021961 | A1 | | 7/2015 | |
| DE | 10 2016 222 068 | A1 | | 5/2018 | |
| DE | 10 2018 128 543 | A1 | | 5/2019 | |
| DE | 102018202644 | A1 | | 8/2019 | |
| EP | 3106288 | A1 | | 12/2016 | |
| EP | 3 473 412 | A1 | | 4/2019 | |
| EP | 3597400 | A1 | * | 1/2020 | .............. B22F 3/003 |
| JP | 2001522326 | A | | 11/2001 | |
| JP | 2004514053 | A | | 5/2004 | |
| JP | 2009-65 09 | A | | 1/2009 | |
| JP | 2016175153 | A | | 10/2016 | |
| JP | 2020532448 | A | | 9/2017 | |
| WO | WO 1998/048993 | A1 | | 11/1998 | |
| WO | WO 2002/036331 | A2 | | 5/2002 | |
| WO | WO 2017/0044892 | A1 | | 3/2017 | |
| WO | WO 2018/202643 | A1 | | 11/2018 | |
| WO | WO-2019048022 | A1 | * | 3/2019 | .............. B22F 10/20 |

OTHER PUBLICATIONS

Chinese Second Examination Opinion Notice mailed Oct. 13, 2024 from Chinese Application No. 202180023128.8, 36 Pages.

Japanese Office Action, Notice of refusal mailed on Feb. 18, 2025, from Japanese Application No. 2022-554801, filed on Feb. 12, 2025, 8 pages.

International Preliminary Report on Patentability received for International Application No. PCT/EP2021/056738 mailed on Sep. 22, 2022, 28 pages.

International Search Report and Written Opinion for International Application No. PCT/EP2021/056738 mailed on Nov. 3, 2021, 37 pages.

German Search Report received for Application No. 10 2020 107 925.7 mailed on Oct. 29, 2020, 5 Pages.

German Search Report received for Application No. 10 2020 128 028.9 mailed on Jul. 13, 2021, 7 Pages.

Chinese First Office Action dated Apr. 25, 2024 for Chinse Application No. 202180023128.8, 22 Pages.

Notice of Decision for Rejection, mailed on Dec. 2, 2025, from Japanese Application No. 2022-554801, filed on Feb. 12, 2025, 6 pages.

* cited by examiner

DEVICE FOR THE GENERATIVE MANUFACTURING OF COMPONENTS, IN PARTICULAR BY MEANS OF SELECTIVE MELTING OR SINTERING

RELATED APPLICATIONS

This application is a § 371 National Phase Application of International Application No. PCT/EP2021/056738, filed on Mar. 16, 2021, now International Publication No. WO 2021/191006, published on Sep. 30, 2021, which International Application claims priority to German Application DE 10 2020 107 925.7, filed on Mar. 23, 2020 and German Application DE 10 2020 128 028.9, filed on Oct. 23, 2020, all of which are incorporated herein by reference in their entirety.

The present invention relates to a device for the generative manufacturing of components, in particular by means of selective melting or sintering.

DE 10 2016 222 068 A1 describes a device and a method for generative component manufacturing with several spatially separated steel guides. A processing head comprises several optical switching elements that can be used to direct several beams to the required position. The processing head is adjustably aligned on a linear axis. The linear axis is, in turn, adjustably mounted on a linear axis that is perpendicular to it. This allows an X-Y movement. The laser beam source or sources are mounted on the linear axis.

WO 2018/202643 A1 discloses a device for additive manufacturing by selective laser sintering. One or more lasers are assigned to one or more laser heads. These lasers are distributed to the individual heads via beam splitters. The heads can be moved in the X and Y direction via rails. The heads can be moved independently of each other. The light supply to the heads is realized by mirrors.

U.S. Pat. No. 10,399,183 B2 describes an additive manufacturing process in which an optical head is supplied with a laser beam via a glass fiber. This allows several laser beams to be directed to the same head and exited in parallel. This allows parallel melting points on the surface of the powder bed.

A similar method is described in U.S. Pat. No. 10,399,145 B2.

US 2015/0283612 A1, US 2014/0198365 A1 and JP2009-65 09A comprise selective laser sintering devices that feature multiple optical heads capable of directing laser beams onto a powder bed. These heads cannot be moved in the X and Y direction themselves, but direct the laser beam to the appropriate positions via mirrors. The advantage here is that the position of the laser focal point can be changed quickly. However, the heads must be comparatively far away from the powder bed and can only illuminate a limited area.

DE 10 053 742 C5 and U.S. Pat. No. 9,011,136 B1 show devices for sintering with a cross-slide arrangement, an additive manufacturing process with multiple heads for plastic printing, and a device with a head that has both a 3D printing and a 3D cutting element.

US 2019/0009333 A1 discloses a device and method for selective laser melting, wherein a several laser heads operating in parallel are provided for melting a material according to a powder bed-based laser melting. Each of the laser heads is movable along a linear traverse and the laser heads can be moved independently of each other. In doing so, the array of laser heads and the powder bed surface can be rotated horizontally relative to each other.

US 2017/0129012 A1 describes a device and method for additive manufacturing of components, wherein the device comprises a plurality of robotic arms, to each of which a deposition head and a laser head are attached adjacent to each other. The robot arms each comprise at least one swivel joint and are designed to move the deposition head and the laser head in all three spatial directions. In this way, material can be deposited on a processing surface by means of the deposition head and this area can be melted with the laser directly afterwards.

CN 106 312 574 A describes a device comprising equipment for additive manufacturing processes as well as for milling processes. The device essentially comprises several robot arms, which can be equipped with gripping elements for providing material on a working platform or for removing finished components, or with a laser head. The robot arms each comprise two joints and are therefore rotatably and pivotally mounted. The device further comprises a central manufacturing arm, which may be equipped with a laser head or a milling head. The central manufacturing space can be moved linearly along a traverse.

DE 10 2018 128 543 A1 discloses a lamination molding device in which two laser heads operating in parallel are provided for melting a material according to a lamination molding process. Both laser heads are coupled to a traverse and are linearly movable independently of each other. The traverse can also be moved. The processing area can be completely covered. The laser beam is guided to the processing area by a focusing unit using two mirror elements.

CN 206 065 685 U discloses a device and a method for 3D printing, wherein a laser for melting a raw material and a cutting laser for processing the produced structures are provided. The laser for melting a starting material and the cutting laser can be moved independently along several traverses both horizontally and vertically.

The invention is based on the object of creating a device for the generative production of components, in particular by means of selective melting or sintering, which is simple in design, allows a high production speed and with which 3D components can be produced with high precision.

The object is solved by a device with the features of claim 1, by a device with the features of claim 13, by a device with the features of claim 18 and by a device with the features of claim 24. Advantageous embodiments are specified in the subsidiary claims.

A device according to the invention for the generative manufacturing of components, in particular by means of selective melting or sintering, comprises a light source for generating a light beam, a processing head that is either coupled to the light source with a beam guide so that the light beam is directed to the processing head, or the light source is arranged directly on the processing head, so that a light beam can be directed by the processing head to a processing area, with the processing head being mounted in a movable position, so that the light beam can be directed onto different locations in the processing area, and wherein a plurality of processing heads are provided for respectively directing a light beam onto the processing area, and the processing heads are each arranged on a carriage that is movable along a traverse.

The device is characterized in that the processing heads are each arranged on one of the carriages by means of a swivel arm that can be swiveled around a vertical swivel axis.

By providing several processing heads, several light beams can be directed simultaneously onto the processing area so that several locations in the processing area can be melted or sintered in parallel. The processing heads are arranged on or at a carriage and can be moved along a traverse. This allows easy and reliable positioning of the processing heads over the processing area.

By providing swivel arms for the processing heads that can be swiveled around a vertical swivel axis, each of which is arranged on a carriage, the processing heads can be quickly positioned at any desired location over a large section of the processing area. This section extends around the traverse, along which the specific carriage with the respective processing head can be moved in an area around the swivel axis of the swivel arm, which extends to both sides by a width corresponding to the length of the swivel arm. This section is therefore stripe-shaped around the traverses with a width corresponding to approximately twice the length of the swivel arms. This strip-shaped section is referred to below as the coverage area, since the processing heads arranged on the carriages of a traverse can be arranged at any position within the coverage area and can thus impinge on or cover the processing area with a light beam at any location in the coverage area.

The swivel arms can be designed to only swivel around the vertical axis. Such a design is very simple compared to multi-axis robot arms. Nevertheless, the processing heads can be positioned very quickly and precisely, and a high throughput is achieved by parallel processing.

The swivel arms can be designed with a length of, for example, at least 5 cm, preferably at least 10 cm or at least 15 cm, and in particular at least 20 cm. The longer the swivel arms, the wider the coverage areas.

It can be useful to position the processing heads only in a restricted angular range of the swivel arms, because the more the swivel arms swivel the processing head away from the traverse, the less accurate the position of the processing head in the direction parallel to the traverse becomes. The angular range can be limited, for example, to a maximum swivel angle with respect to the traverse of maximum 60° or maximum 45°. With a maximum swivel angle of 45°, the width of the coverage area is reduced to one length of the swing arm.

The device can comprise several traverses that are arranged parallel to each other. The traverses are preferably spaced in such a way that the coverage areas overlap from adjacent traverses.

Along the swivel arms, the beam line for the respective light beam can be formed by means of reflector elements. This enables very light swivel arms, which have a low rotational moment of inertia, so that they can be quickly swiveled to any rotational position.

The swivel arms are preferably made of plastic, in particular of fiber-reinforced plastic. A mirror can be provided at each end remote from the axis of rotation of the swivel arm for directing the respective light beam onto the processing area.

The beam lines can at least partially be designed as light guides. The light guide can extend from the light source to the respective processing head. However, the respective light guide can also merely be guided from the light source to the pivotally mounted end of the respective swivel arm and be arranged there with its end in such a way that the light beam is coupled into a beam line along the swivel arm, which is formed by means of reflector elements. Such an embodiment has the advantage that the swivel arm can be rotated by 360° or more without having to rotate the light guide. The end of the light guide at which the light from the light guide is coupled into the beam line on the swivel arm, can be stationary with respect to the carriage to which the swivel arm is attached.

Alternatively, the end of the light guide can be arranged stationary on the swivel arm in such a way that the light beam is emitted in the direction of the free end of the swivel arm, preferably parallel to the swivel arm. At the free end of the swivel arm, a reflector element can be provided for directing the respective light beam onto the processing area, such as a deflection mirror.

The reflector element can be a parabolic mirror or a mirror with a free-form surface for combining the light, so that no optical lens is required in the beam path.

The traverses on which the carriages are movably mounted can be arranged in a stationary position. This is particularly advantageous in connection with a design with processing heads arranged on swivel arms, since such a stationary arrangement is much easier to control to avoid collisions of different swivel arms than in a device in which the swivel arms can be swiveled, the carriages can be moved along the traverses and the traverses themselves can be moved transversely to their longitudinal direction. In addition, with a stationary arrangement of the traverses and swivel arms on the carriages, complete coverage of the processing area can be achieved with just a few traverses, provided that the swivel arms are not too short. Since the processing heads arranged at the free ends of the swivel arms can be formed very lightweight, for example by only a small mirror, a low rotational moment of inertia can be achieved even with longer swivel arms with a length of, for example, at least 10 cm, preferably at least 15 cm, and in particular at least 20 cm.

The device can be designed in such a way that one or more traverses can be retrofitted. In this way, on the one hand, the processing area can be subsequently enlarged and, on the other hand, the density of the traverses and thus of the processing heads can be increased in a predefined processing area. When increasing the density of the traverses and thus reducing the distance between the traverses, it can be useful to attach the swivel arms interchangeably to the carriage so that shorter swivel arms can be used if the distance between the traverses is shorter.

Preferably, at least two independently movable carriages are mounted on each carriage, with each carriage comprising a processing head. More than two carriages, for example three or four carriages, can also be provided per traverse.

Preferably, several light sources are provided, each of which is assigned to one or more processing heads. The light sources are preferably lasers, in particular $CO_2$ lasers or ND:YAG lasers. $CO_2$ lasers are mainly used for melting or sintering plastic powder, ND:YAG lasers for melting or sintering metal powder. For example, such a $CO_2$ laser has a light output of 30 W to 70 W and a ND:YAG laser of 100 W to 1,000 W and more. The light sources can also be light-emitting diodes, in particular super-luminescence light-emitting diodes, and/or semiconductor lasers.

By providing multiple light sources and multiple processing heads that can be positioned independently in the processing area, it is possible to melt or sintered powder simultaneously at multiple locations in the processing area to produce a 3D component. This simultaneous melting or sintering of the powder significantly increases the production speed of the generative production with the present device compared to conventional devices. Even if the processing heads remain at each location for a slightly longer time, a high production speed can be achieved. This makes it possible for light sources with comparatively low light output to be used. This significantly reduces the cost of the device.

A multiplexer can be provided to distribute the light beam of one of the light sources to different beam lines. Such a multiplexer is preferably useful for very high-intensity light sources, with which the powder can be melted or sintered with short pulses. The device preferably has a powder bed in the processing area, in which powder can be located, which is selectively melted by means of the light beam.

The powder can be a metal powder or plastic powder.

The individual swivel arms can be arranged at different heights to avoid collisions when moving the swivel arms.

The individual light sources can be designed to emit light beams with different frequencies or different frequency ranges and/or different intensities. This allows the selective melting and/or sintering process to be controlled individually. This allows, for example, a control of the porosity of the product produced with this process.

The light beams can also be focused to different degrees on the processing area. The focusing can be adjusted, for example, by means of a lens and/or a height adjustment of the processing heads.

With the device according to the invention, powder can be melted or sintered simultaneously at several locations in a powder bed.

An inert gas atmosphere can be formed in the entire device, in particular a nitrogen and/or argon atmosphere. By using an inert gas atmosphere, oxidation of the powder or component can be prevented during component production. During the formation and maintenance of the inert gas atmosphere, it is possible to filter dirt particles from the interior of the device in a simple manner.

According to another aspect of the invention, a device is provided for the generative production of components, in particular by means of selective melting or sintering, having a processing table with a preferably horizontal table plate, which forms a locating surface for the powder bed, whereby the processing table comprises a wall which is at least partially laterally to the table plate, and the table plate and the wall together define the processing area.

The device is characterized in that the wall can preferably be moved perpendicular to the table plate.

During the production of a component, the wall is moved vertically relative to the processing table after one or more component layers have been produced. For this purpose, the upper side of the wall can form a flat surface with the table plate of the processing table at the beginning of component production. Powder is applied to the table plate and smoothed out. A powder layer can have a thickness of about 20 μm-100 μm. Subsequently, the first layer of the component is created by bonding at least a portion of the powder particles. The bonding can be done by melting and cooling, by sintering or by local application of a binder. After the first component layer is created, the wall can be moved upward by the height of the first component layer. In this way, a chamber is formed between the wall and the supporting surface. The powder bed is formed in this chamber. The powder bed comprises the component layer already formed and the remaining powder that is not bonded together. Subsequently, another powder layer can be applied, smoothed out and a second component layer can be produced. The wall can then be adjusted in height again by the thickness of the second component layer. In this way, the chamber formed by the wall and the supporting surface is enlarged in the vertical direction and then comprises the two component layers and the remaining powder material that is not bonded together. The above steps are repeated until the component is completely manufactured. The wall, which is generally lighter in weight than the processing table, can be moved with little effort. The wall can be moved after one or more layers have been formed.

It is advantageous if the processing table is designed to be stationary and not movable. Thus, the known set-up, namely that the processing table is moved downwards relative to the stationary wall surrounding the processing table during component production, can be reversed. In a device for the generative manufacturing of components with a base area of the processing table of 1.5 m×1 m and a stroke of 0.5 m, the working volume is 0.75 $m^3$. If this working volume is filled with aluminum powder, then the content weighs approximately 2 t. In the case of steel powder, the weight is approximately 6 t. Since only the wall, which is usually much lighter than the processing table and the additive manufactured object on it, needs to be moved, a small and cost-efficient drive can be used. At the same time, the structure of the processing table can be designed to be particularly cost-efficient but nevertheless stable, since it is not necessary to be able to move the processing table. This further reduces the overall cost of the device.

For vertical adjustment of the wall, for example, an electric, pneumatic and/or hydraulic drive can be used.

The wall can be provided at its upper edge with a collar projecting horizontally outward, which prevents powder from falling onto a bed-plate in areas not intended for it. The collar can be provided on only one side of the powder bed, or it can be formed on several or even circumferentially.

The wall may be formed of multiple wall sections, whereby the wall sections can be moved individually and/or together. Individual wall sections can then be moved independently of each other. The wall can thus be adjusted to suit a wide variety of possible applications.

An application dispenser can be provided for applying powder to be selectively melted or sintered to the processing table or to the processing area. The application dispenser can be movable in a horizontal direction over the processing table to distribute the powder over the entire processing area. The application dispenser can have a scraper or be coupled to a scraper so that the powder applied is smoothed out. By using an application dispenser, the installation space or the footprint of the device can be reduced, since a supply cylinder can be dispensed with. However, the use of a supply cylinder instead of an application dispenser can be advantageous to reduce the turbulence of the atmosphere in the interior of the device caused by the movement of the application dispenser.

The wall can be movable together with at least one other component, preferably a light source and/or a processing head and/or a scraper and/or an application dispenser for applying powder material and/or a supply cylinder. It is particularly advantageous if the processing heads can be adjusted in height along with the wall. This ensures that the processing heads always have the same distance to the processing area or the surface of the powder bed. This eliminates the need for time-consuming adjustment of an optimum distance between the processing head and the processing area, as well as for renewed focusing or adjustment of an optical feature of the processing head. It is known to the skilled person which components, depending on the structure of the device, should preferably have a constant distance to the wall or the processing area or to each other during component production. These components can be designed to be movable coupled to the wall. In this case, only one drive is required to move these components relative to the processing table, which makes the structure simple.

The wall can be moved depending on the thickness of the next component layer to be formed. It is possible that the individual component layers have different thicknesses. For example, individual component layers can be thicker than others during production if high molding accuracy is not required in the corresponding component areas. If, on the other hand, high molding accuracy is required in individual component areas, the component layer to be manufactured can have a thinner thickness. In this way, component production can be accelerated in individual component areas and thus overall. The component can therefore be manufactured particularly quickly depending on the dimensional accuracy required in the respective areas.

In a preferred embodiment, a collection device is provided, preferably in the form of a collection basin, to collect excess powder released from the processing area. During production, powder can get out of the processing area, for example, powder can be pushed by the scraper from the processing table or table plate or from the collar. This excess powder can be collected by the collection device. In a particularly simple embodiment, the collection device can be formed by a collection basin into which the excess powder falls. This excess powder can then be collected and reused. The collecting basin can be arranged partially or completely around the work bench, the wall and/or the collar, so that any excess powder which is swept from the work bench, the wall and/or the collar can fall into the collection basin.

A suction device and filter can be provided to extract, filter and reuse the excess powder. The powder collected by the collecting device is extracted, then fed into a filter and conveyed back to the processing area in a circuit. The filter can filter out powder grains and/or dirt particles that are too large and/or already bonded together. For example, a filter can have a filter size of 120 μm, so that only particles with a particle size smaller than 120 μm can pass through the filter. Different filter sizes can be used depending on the powder and particle sizes used. The powder material cleaned in this way can be fed to a storage container and/or to the application dispenser for reuse. Through this recirculation of the powder material, the material loss can be kept low. At the same time, it can be ensured that no powder particles that have already bonded together are reused, or that no dirt particles are used. The use of already interconnected powder particles or dirt particles can lead to inaccuracies or defects in the 3D component and negatively affect the stability or strength. The accuracy and quality of the component production can still be ensured to a high degree by using an extraction system and a filter.

The work bench can be tempered and kept at a predetermined temperature. In this way, stresses in the component, in particular in the first layers, can be avoided. For example, when manufacturing a metal component, the work bench can be heated to a temperature between 100° C. and 300° C., preferably to a temperature between 150° C. and 200° C. When manufacturing a plastic component generatively, the temperature of the work bench can be lower and, for example, between 40° C. and 120° C., preferably between 60° C. and 100° C. The temperature can be adjusted in each case to the material used.

Preferably, an optical system, in particular a zoom lens, is provided to change the focus of the emitted light beam. The focus of the light beam can be easily adjusted to different distances to the processing area. At the same time, the energy input and the irradiated area can be changed by a targeted focus setting.

According to a further aspect of the invention, a device for generative production of components, in particular by means of selective melting or sintering, is provided comprising at least one movable component, preferably a processing head and/or a processing table and/or a wall and/or a scraper and/or an application dispenser, and a drive for moving the movable component. The device is characterized by the fact that at least one distance sensor is provided for preferably electro-optical distance measurement. The distance sensor can be arranged on or atop the movable component and measure the distance to another object, or the distance between the sensor and the other object. However, it is also possible that the distance sensor is arranged on another object and measures the distance to the movable component. The distance between the movable component and another object can be measured and determined at any time.

Preferably, the distance sensor is arranged in a stationary position to measure the distance between the sensor and the movable component. The distance between a fixed point and the movable component can be measured and determined at any time. The movable component can comprise a reference object, wherein the distance sensor detects the reference object and measures the distance to the reference object. For example, a reflector, in particular a prism reflector, can be used as a reference object. The distance sensor can be designed to be swiveled so that it can be aligned with the reference object.

The distance measurement can be done by triangulation and/or measurement of the phasing and/or measurement of the operating time. In a distance measurement by measuring the phasing, a laser beam is emitted. The phase shift of the reflected laser beam or its modulation compared to the emitted beam depends on the distance. This phase shift can be measured and used to determine the distance traveled. Distance measurement by means of measuring the phasing has a high accuracy. With laser triangulation, a light beam is focused on the measuring object and observed with a camera located next to the sensor, a spatially resolving photodiode or a CCD line. If the distance between the measuring object and the sensor changes, the angle at which the light point is observed also changes, and thus the position of its image on the photo receiver. From the change in position, the distance of the object from the laser projector is calculated using the angle functions. Distance measurement using triangulation is simple, cost-efficient and yet very accurate. When measuring the operating time, a light pulse or a modulated light beam is emitted. The operating time is the time it takes for the light beam to move from the source to a reflector, usually a retro reflector, and back to the source. By measuring this operating time, the distance between the source and the object can be determined via the speed of light. For distance measurement, alternatively or additionally, sensors can be used that can scan lines or surfaces or planes, or that can perform spatial measurements, such as stereo cameras for three-dimensional localization of one or more objects. Due to the large recording range, corresponding sensors do not have to be designed to swivel.

Instead of optical sensors, other sensors, such as ultrasonic sensors or sensors that determine the distance by means of the operating time of radio waves, can be used.

In an advantageous embodiment, a control and regulating device is provided that is designed in such a way that the movable component can be moved to a set position as a function of the measured distance between the distance sensor and the movable component. The use of distance sensors together with a control and regulating system enables the use of a low-cost and particularly lightweight reciprocator for moving the movable component. A low-cost and lightweight reciprocator has a low positioning accuracy, but can be moved particularly quickly. The position of the movable component can be controlled as a function of the distance between the movable component and the distance sensor. The closer the movable component approaches its required position, the slower the component can be moved. In this way, it can be ensured that the movable component can reach the required position exactly. The reciprocator can be simple and, above all, light and inexpensive, since the precision of the movement and positioning is ensured by the distance measurement and the control in a closed servo loop. Proportional controllers, so-called P controllers, proportional-integral controllers, so-called PI controllers, and/or proportional-integral-differential controllers, so-called PID controllers, can be used as controllers in the servo loop.

Two, preferably three distance sensors can be provided for distance measurement between the distance sensors and the movable component to determine the spatial position of the movable component. If the movable component is only moved in one plane, i.e. in two dimensions, its position can be precisely determined by measuring the distance from two distance sensors. By measuring three distances between the movable component and three stationary distance sensors, the spatial position of the movable component can be precisely determined in three dimensions. If the movable component is only moved in one direction, one sensor can also be sufficient for distance measuring.

In a preferred embodiment, more than three distance sensors and at least two movable components are provided, wherein each movable component can be detected in any position by at least three distance sensors for distance measurement. As a result, one distance sensor can be used for distance measurement between itself and the two movable components. Depending on the positions of a first movable component, a distance sensor may be covered by this first movable component in such a way that a distance measurement to a second movable component is not possible. In such a case, the distance measurement can be carried out via another distance sensor that has direct optical access to the second movable component. This allows different or the same distance sensors to be used for each position determination of a movable component by means of distance measurement.

The distance sensors can be arranged stationary in the device, for example connected to the foundation of the device via a carrier. The distance sensors can determine the position of the surface of the powder bed by means of a distance measurement and subsequently determine the position of a movable component, for example a processing head, by means of another distance measurement. The processing head can be moved to a set position depending on the position of the powder bed, i.e. the height of the powder bed, in order to set the required distance between the processing head and the surface of the powder bed. The movement of one or more processing heads into their required position can be carried out in this case with the aid of the control and regulating device described above. It is also possible that one or more distance sensors are connected to or arranged on a processing head and the distance between the processing head and the powder bed surface is determined in order to subsequently move the processing heads to a required distance from the surface of the powder bed.

In addition, it is also possible for the position of one or more processing heads to be set as a function of the position of the movable wall, in particular a top edge and/or a horizontal surface. To determine the distance between the movable wall and the processing head, one or more distance sensors can be connected to the processing head and/or arranged in a stationary manner in the device.

Instead of the position of one or more processing heads, the position of a traverse or another component of a direction of movement, for example a carriage, can also be determined and positioned relative to the movable wall or surface of the powder bed. For this purpose, one or more distance sensors can be directly connected to the traverse and measure the distance to the surface of the powder bed.

A scraper can also be positioned relative to the powder bed surface or a movable wall in the same way. At least one distance sensor can be connected to the squeegee for this purpose, or can be arranged stationary in the device.

It is also be possible to position an application dispenser as a function of the position of the movable wall or the powder bed surface. For this purpose, the application dispenser can have at least one distance sensor or at least one distance sensor can be arranged stationary in the device.

The movable wall can also be moved relative to the surface of the powder bed, for example to a position that is higher than the powder bed by one layer thickness. For this purpose, it is advantageous if the distance sensors are arranged stationary in the device.

In addition, it is also possible to move a supply cylinder relative to a processing table. In the case of a device of the above-mentioned type, the processing table can also be moved in a controlled manner. For example, after a component layer has been completed, the processing table can be lowered by a defined layer thickness in order to be able to apply a new powder layer. In this way, the distance between the processing heads and the surface of the powder layer can be kept constant for each component layer to be produced. The distance sensors are then preferably arranged stationary in the device.

Several components can also be moved together in a coupled manner. For example, a scraper with one or more processing heads and/or together with an application dispenser can be positioned in a controlled manner at a required distance from the surface of the powder bed in a vertical direction. The vertical distance between the scraper and the processing heads and/or the application dispenser is then the same at all times.

Three distance sensors can be permanently assigned to each movable component for distance measurement. The same three distance sensors can be assigned to the same movable component for each distance measurement. However, it is also possible for the distance sensors to be reassigned to a component for each distance measurement. In this way, each movable component can be assigned partially or to completely different distance sensors for each new distance measurement than for a previous distance measurement.

According to a further aspect of the invention, a device for generative production of components, in particular by means of selective melting or sintering, is provided, comprising a glass plate, the surface of which forms a support surface for powder, a processing area above the glass plate, a light source for generating a light beam, a processing head arranged below the glass plate, which is either coupled to the light source by a beam guide, so that the light beam is arranged directly on the processing head, so that a light beam can be directed from the processing head through the glass plate onto the processing area, the processing head being movably mounted so that the light beam can be directed to different locations in the processing area. The device is characterized in that several processing heads are provided for the respectively directing a light beam through the glass plate onto the processing area, wherein the processing heads are each arranged on a carriage that can be moved along a traverse.

In the aforementioned device, powder can be deposited on the surface of the glass plate, for example, with the aid of an application dispenser. The glass plate forms a support surface for the powder. A scraper can be provided for smoothing the powder layer. A support structure can then be placed on the powder layer. A light beam can be directed from a processing head, which is located below the glass plate, through the glass plate to the corresponding areas with powder. The powder can be selectively melted or sintered and bonded together, forming a first component layer on the support structure. The formed component layer can then be lifted together with the support structure. For this purpose, a lifting device can be provided for supporting gripping and lifting of the component or component layers in the vertical direction. The powder still on the glass plate can be removed from it. Powder can then be re-applied to the glass plate. The already formed component layer can be placed on the applied powder. By re-directing a light beam onto the processing area, the new component layer can be formed and bonded to the first component layer. These steps can be repeated as often as required until the component is completely formed. The component will be manufactured from top to bottom. With this setup of the device, material can be saved, since the powder can only be deposited in the areas where a component layer is to be formed. It is then not necessary to cover the entire glass plate with powder. The glass plate has to carry significantly less weight, as the component is held by the lifting device and the glass plate, therefore, only carries the powder bed for the new component layer to be formed. The already formed component layers are freely accessible and not enclosed by powder. Therefore, the component can already be further processed during production, for example by cutting the component.

The previously described embodiments of the invention can be combined as required. The aforementioned aspects of the invention are not limited to the combinations of features of the invention dictated by the selected paragraph formatting.

Further features of the present invention result from the following description of the invention with reference to the drawings and the drawings themselves. In this regard, all of the features described and/or illustrated constitute, by themselves or in any combination, the subject matter of the present invention, irrespective of their summary in the claims or their interactions.

Figure 2:
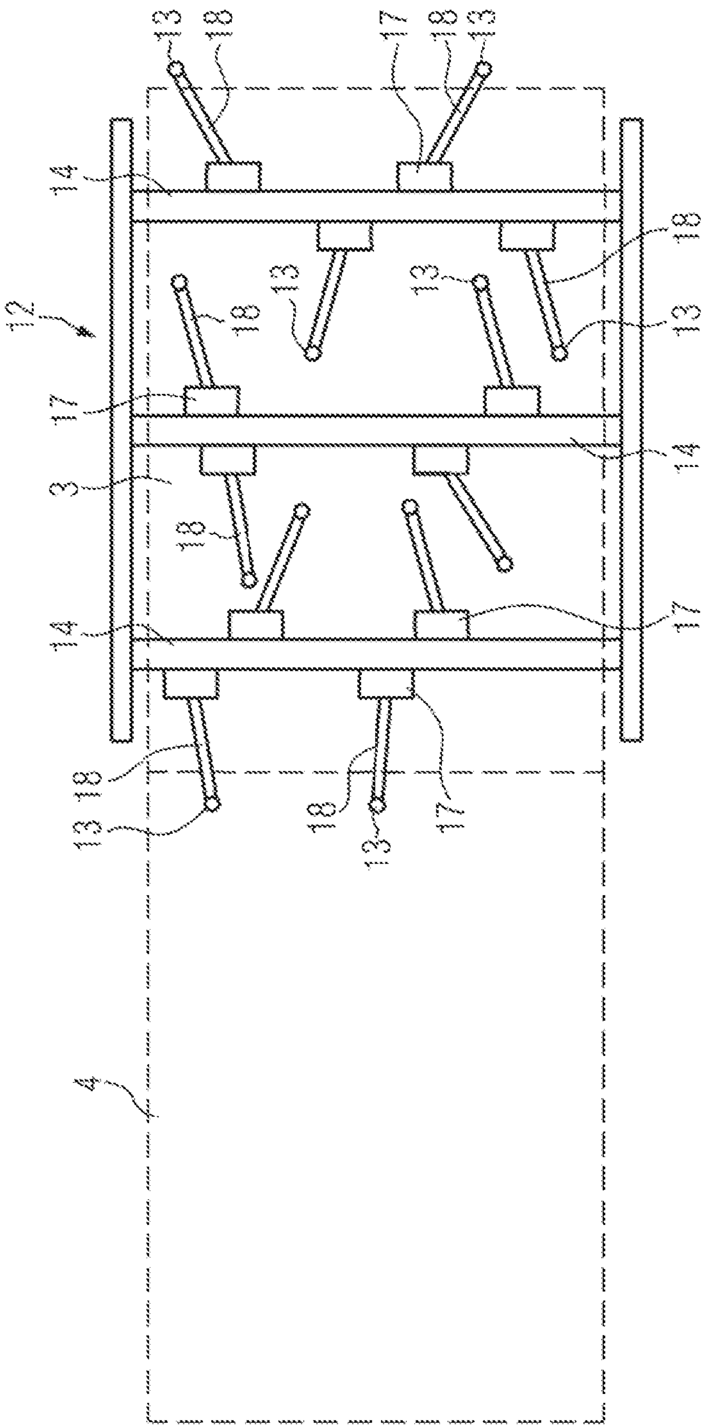
Figure 3A:
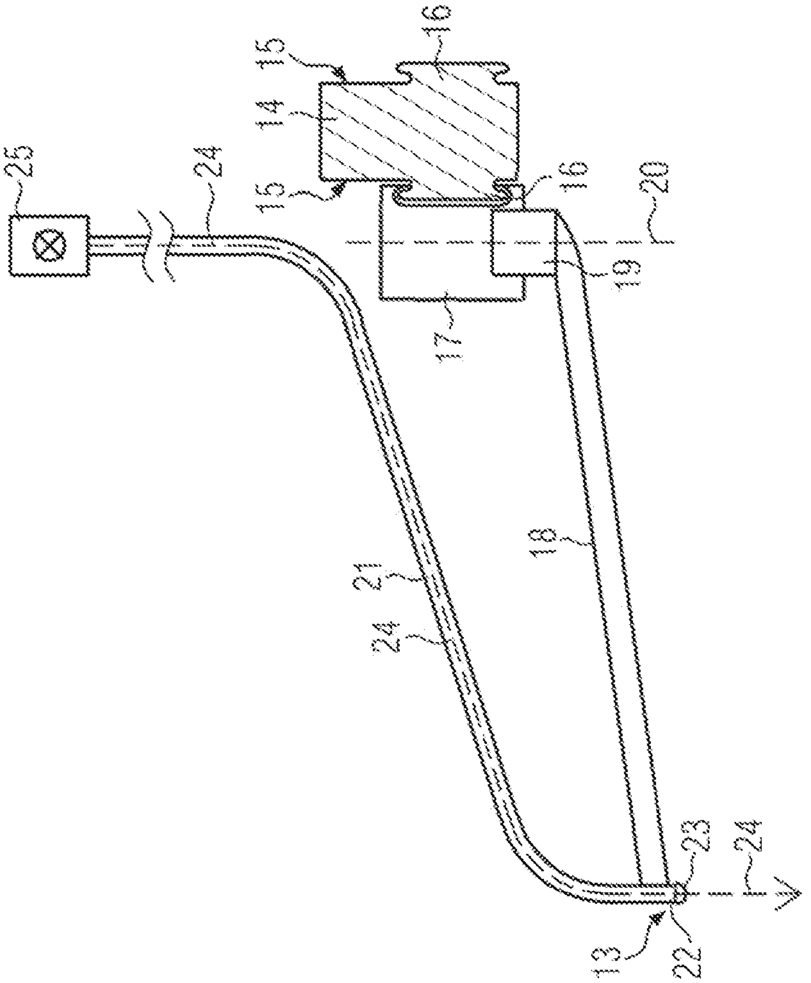
Figure 3B:
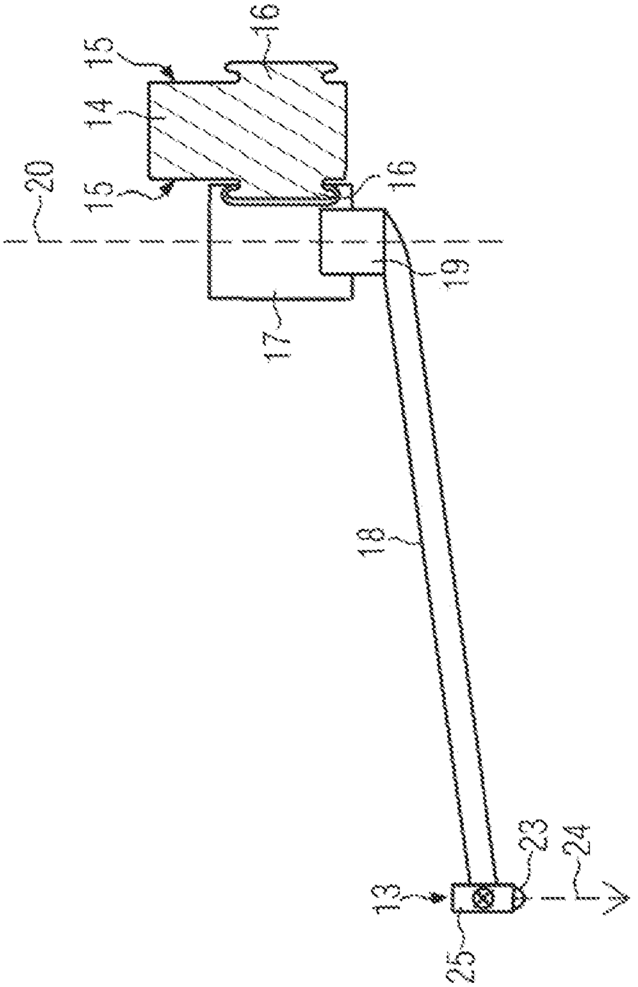
Figure 3C:
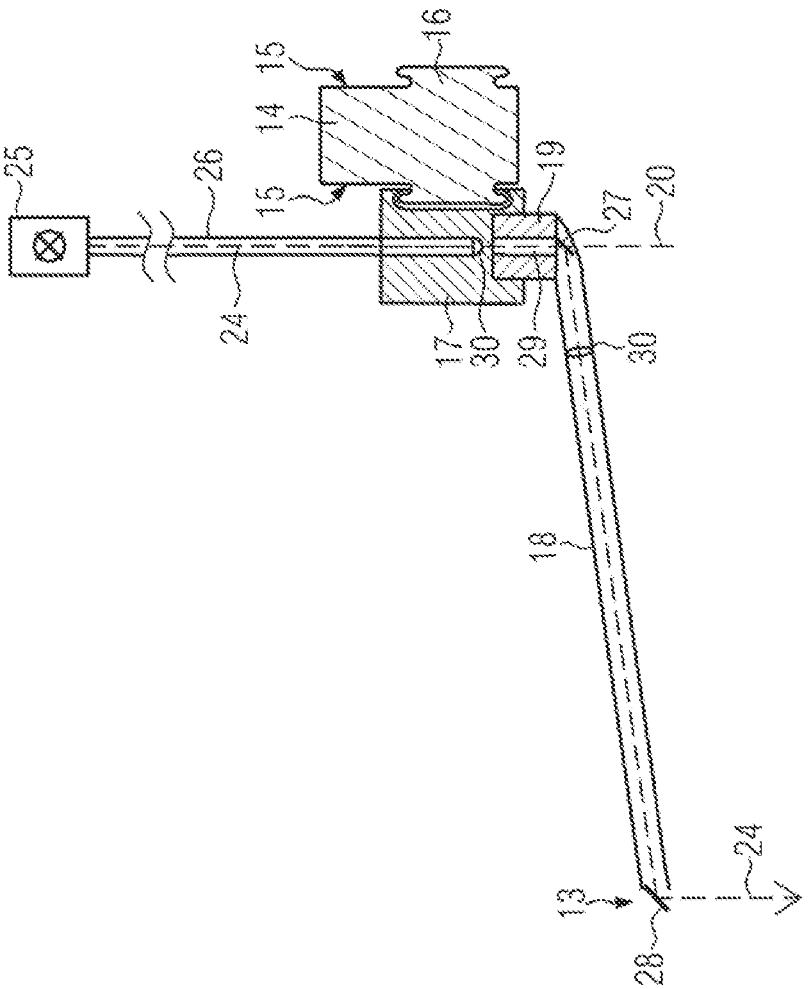
Figure 3D:
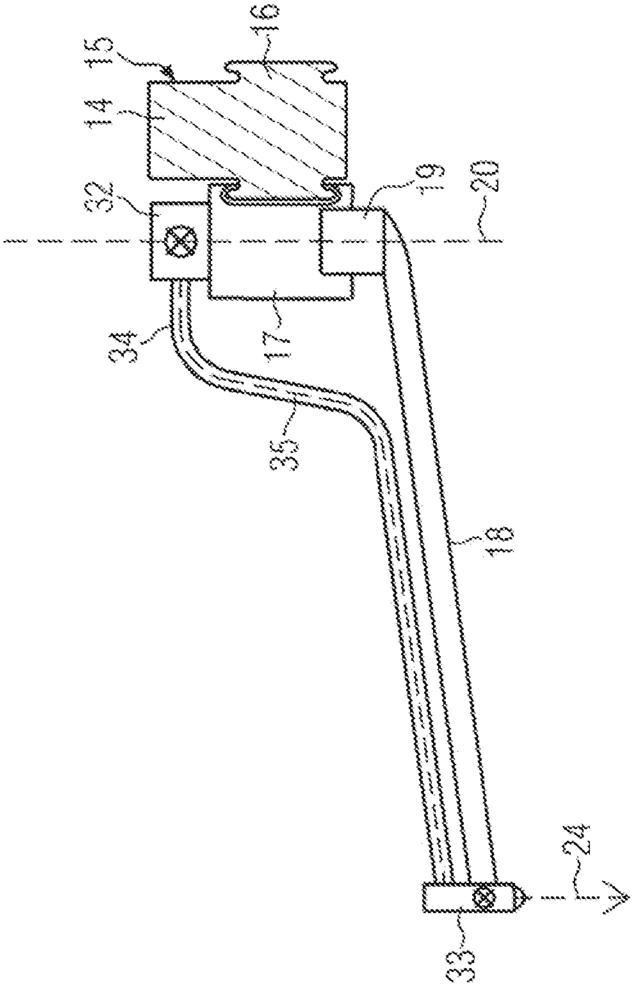
Figure 3E:
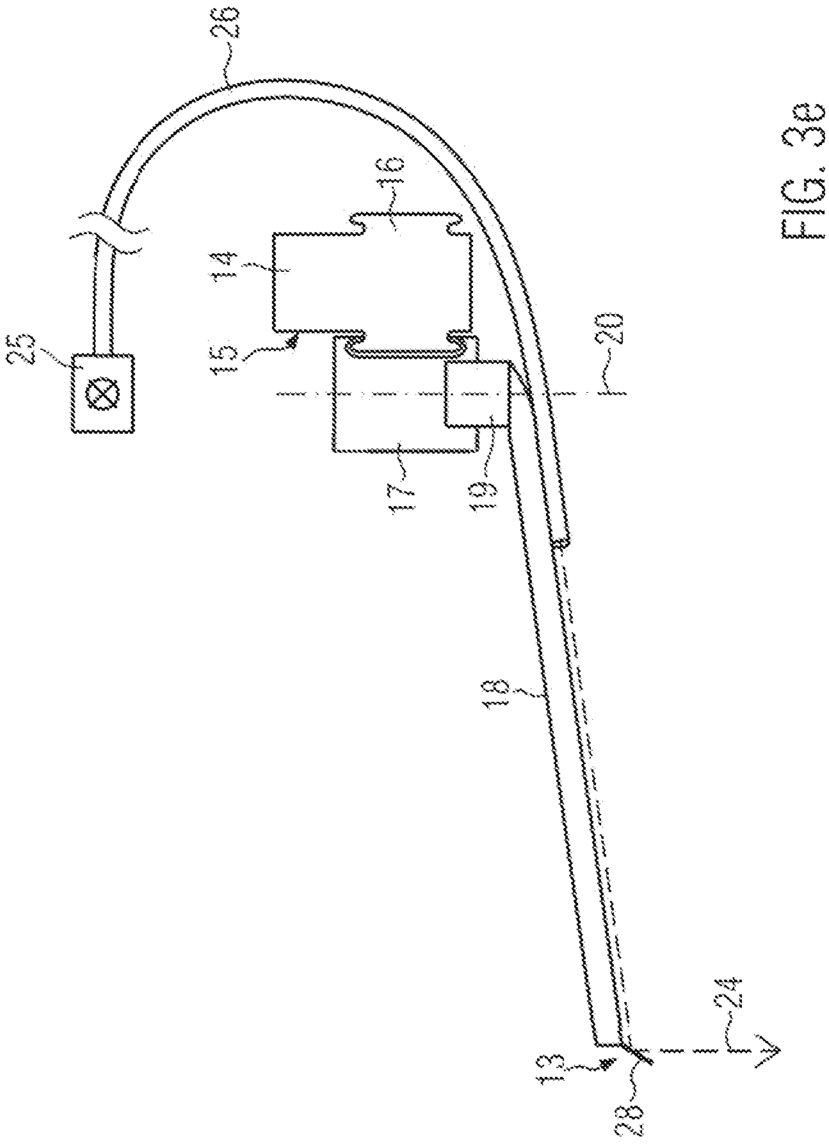
Figure 4:
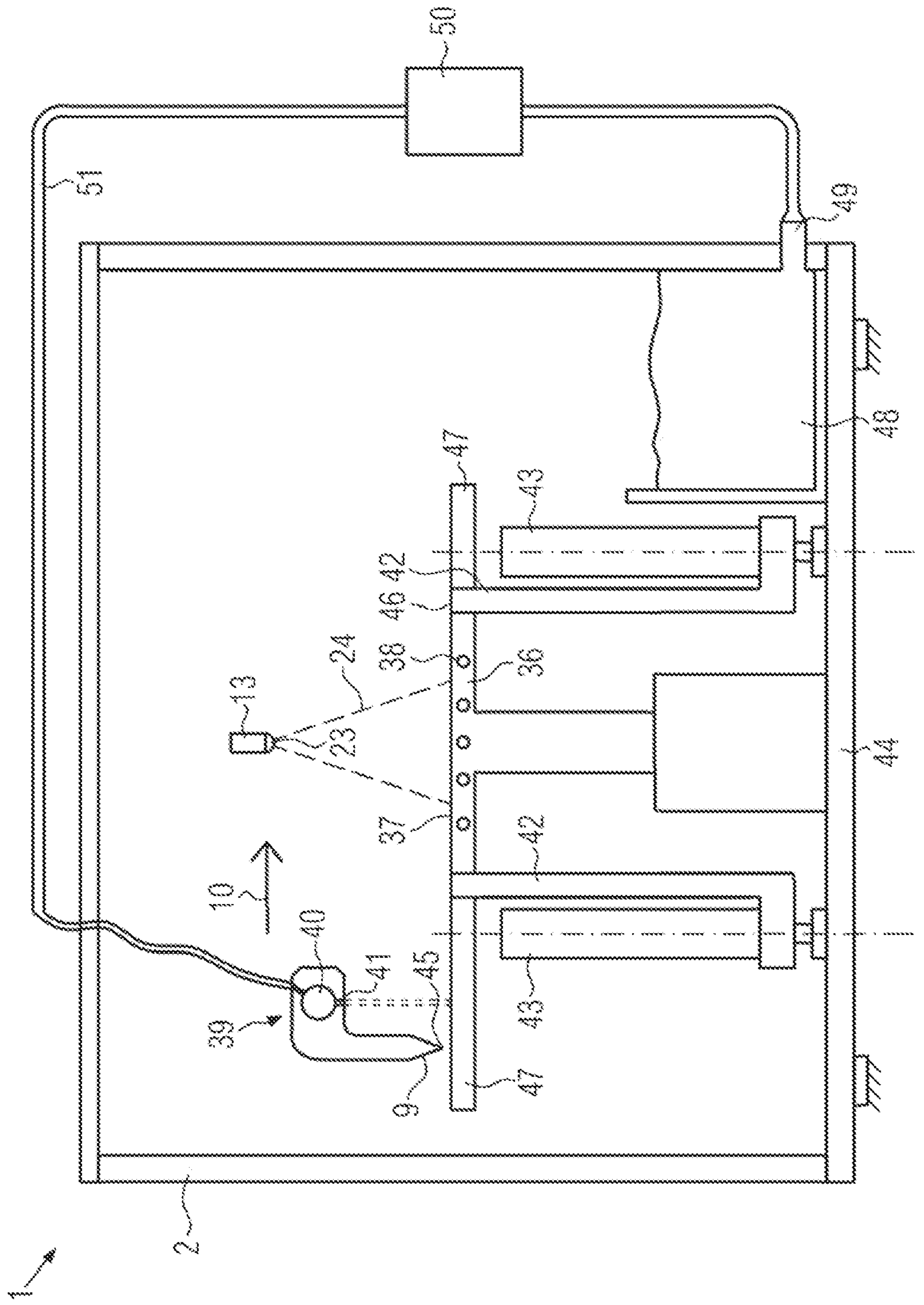
Figure 5:
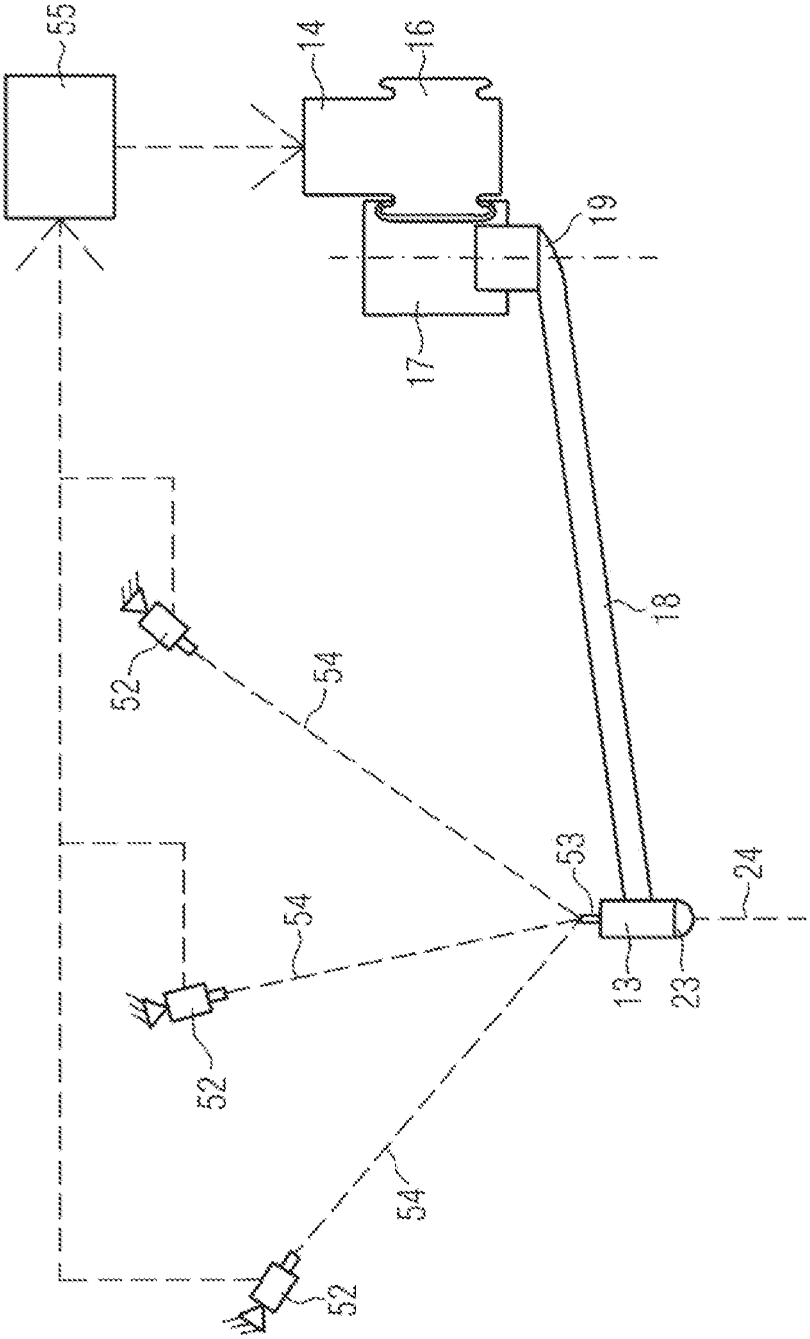
Figure 6:
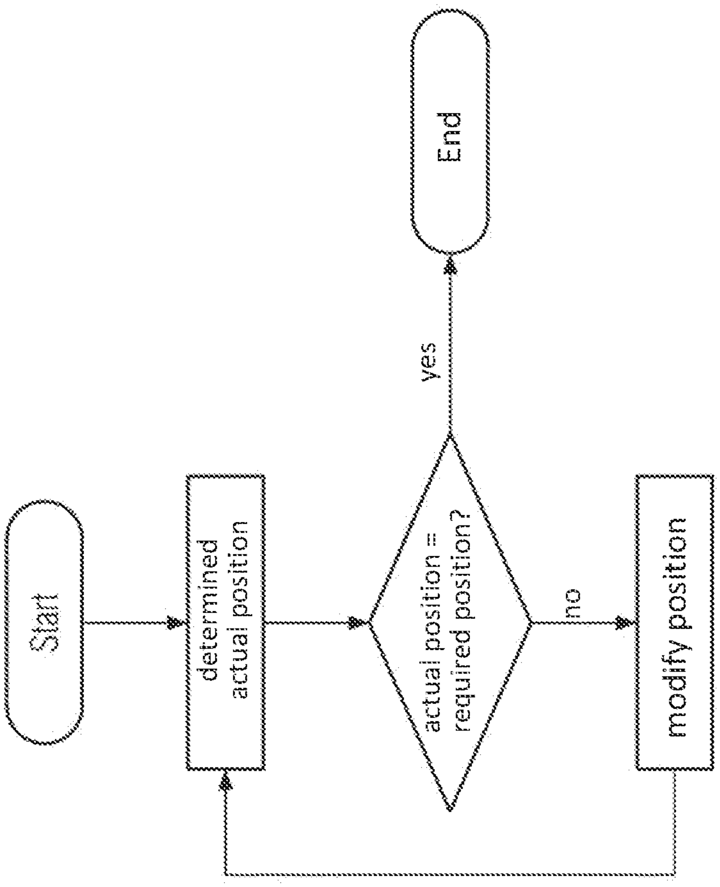
Figure 7:
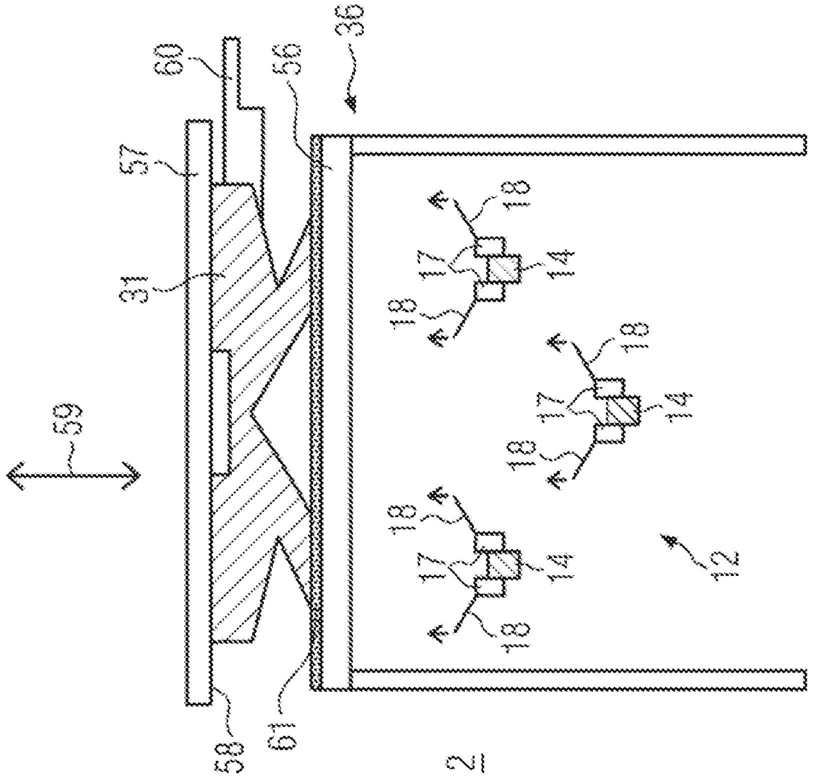

The invention is explained in more detail below using the drawings as examples. The drawings show schematically in:

FIG. 1 a process chamber of a device for generative producing of components in a lateral sectional view, FIG. 2 a supply cylinder and a powder bed in top view with several processing heads, which can be arranged freely above the powder bed, in a top view, FIG. 3*a* a swivel arm for positioning of a processing head, wherein a beam guide is formed from a light guide that extends from a light source to the processing head, FIG. 3*b* a further swivel arm that has a light source at its free end in the lateral view, FIG. 3*c* a further swivel arm, in which a beam guide is formed as a light guide, which extends from the light source to the swivel joint of the swivel arm, wherein a beam guide formed by means of reflector elements is provided along the swivel arm, in a schematic, lateral sectional view, FIG. 3*d* a further swivel arm with a pumped laser, wherein the light pump and resonator are arranged spatially separated in a lateral view, FIG. 3*e* a further swivel arm in which a beam guide is designed as a light guide, which extends from the light source to the swivel arm and its end remote from the light source is arranged parallel to the swivel arm and points to the free end of the swivel arm 18, a reflector element for deflecting the light beam being provided at the free end of the swivel arm, in a schematic, lateral sectional view, FIG. 4 a second embodiment of a process chamber of a device for generative producing of components in a lateral sectional view, FIG. 5 a swivel arm for positioning a processing head with sensors for detecting the spatial position of the processing head in a side view, FIG. 6 a procedure for adjusting the spatial position of the processing head shown in FIG. 5, and FIG. 7 a processing table with a glass plate and several processing heads, which can be arranged freely below the glass plate, in a lateral sectional view.

In the following, an embodiment example of a device for the generative production of components, which in this document is briefly referred to as “3D printer” 1, is explained. Such a 3D printer 1 has a process chamber 2 that is closed on all sides, in which a powder bed 3 and a supply cylinder 4 are located (FIG. 1, FIG. 2). A supply piston 5 is arranged in the supply cylinder 4, which can be raised or lowered vertically by means of a first piston/cylinder unit 6.

The powder bed 3 is similarly formed from a cylindrical body that is approximately rectangular when viewed from above, in which a production piston 7 is vertically displaceably mounted, which can be actuated by means of a second piston/cylinder unit 8. The powder bed forms a processing area in which a 3D component 31 can be produced.

The supply cylinder 4 and the powder bed 3 are arranged in the process chamber 2. The powder bed 3 is arranged adjacent to the supply cylinder 4. A scraper 9 is provided, which can be moved in the direction of movement 10 (FIG. 1) in such a way that a powder 11 stored in the supply cylinder 4 can be spread into the powder bed 3. The scraper 9 thus transfers a surface layer of powder from the supply cylinder 4 to the surface in the powder bed 3. By gradually raising the supply piston 5 and gradually lowering the production piston 7, the surface of the powder 11 in the powder bed 3 and in the supply cylinder 4 can be kept at approximately the same level.

In the area above the powder bed 3, a movement device 12 is provided for moving a large number of processing heads 13.

The movement device 12 comprises several traverses 14, which extend across the powder bed 3. The traverses 14 are arranged parallel to each other. In the present example, three traverses 14 are provided (FIG. 1, FIG. 2). The middle traverse 14 is arranged slightly higher than the two outer traverses 14.

The traverses 14 have an approximately rectangular cross-section, each with a rail profile 16 protruding at the vertical longitudinal surfaces 15, which extend over the entire length of the traverse 14 (FIG. 3*a*-3*e*). Two carriages 17 are mounted on the rail profiles 16 of each traverse 14 so that they can be moved in the longitudinal direction of the traverses 14. The carriages 17 can be moved automatically along the respective traverse 14 by means of drive equipment. The drive equipment may comprise a drive belt driven by an external motor that is coupled to the respective carriage 17. However, drive equipment, such as a drive wheel driven by a motor, can also be provided in the carriage 17 itself. In principle, it is also possible to drive the carriage by means of a linear motor, in which case the corresponding drive means and drive countermeans must be provided on the carriage 17 and on the traverse 14.

A swivel arm 18 is arranged on the carriage 17 by means of a swivel joint 19. The swivel arm 18 is rotatably mounted with the swivel joint 19 around a vertical swivel axis 20. A stepper motor (not shown) is provided on the carriage 17 for rotating the swivel arm 18 around swivel axis 20. At the end of the swivel arm 18, remote from the swivel axis 20, is provided the processing head 13, which in the embodiment shown in FIG. 3*a* is formed by an end 22 of a light guide 21 and an optical lens 23 arranged at the end 22 of light guide 21. The processing head 13 is arranged in such a way that a light beam 24 guided in the light guide is emitted vertically downward.

The light guide is formed of a flexible optical fiber. The optical fiber can be, for example, a glass fiber or an optical polymer fiber.

The stepper motor and swivel joint 19 are arranged very close to the swivel axis. This means that the essential mass of the parts that can be rotated with the swivel arm 18 is concentrated around the swivel axis 20. The swivel arm 18 itself is comparatively light, so that the moment of rotary inertia is low and the swivel arm 18 can be rotated quickly and precisely around the swivel axis 20.

The light guide 21 leads to a light source 25, which is located a bit away from the swivel arm 18. The light source 25 is preferably a laser, in particular a $CO_2$ laser or a ND:YAG laser or a fiber laser. The light source 25 can also be a semiconductor laser or a light-emitting diode (LED), in particular a super luminescence light-emitting diode.

An array of light sources 25 may also be provided with a light source 25 for each processing head 13.

Further embodiments of the swivel arm are explained below, which are designed in exactly the same way as the embodiment described above with reference to FIG. 3*a*, unless otherwise specified.

In an alternative embodiment of the swivel arm 18 (FIG. 3*b*), the light source 25 together with the optical lens 23 is arranged directly at the end of swivel arm 18, remote from the swivel axis 20, in such a way that a light beam 24 can be emitted vertically downwards. Otherwise the swivel arm 18 is constructed in exactly the same way as in the above-explained embodiment according to FIG. 3*a*.

In accordance with a further embodiment (FIG. 3*c*), a beam guide is formed from the light source 25 to the carriage 17 by means of a light guide 26 and along the swivel arm 18 by means of reflector elements 27, 28. In the present embodiment, the reflector elements 27 and 28 are each formed as mirrors. However, they can also be represented by other optical elements deflecting a light beam, such as prisms or the like.

The swivel arm 18 is designed as a hollow plastic pipe, which may in particular be made of a fiber-reinforced plastic. Such a plastic pipe is very light and rigid.

The swivel joint 19 has a vertically extending through opening or through hole 29. The end of the light guide 26 remote from the light source 25 is arranged adjacent above the through hole 29 together with a coupling lens 30, so that the light beam generated by the light source 25 is transmitted via the light guide 26 and from there is coupled into the through hole 29 of swivel joint 19. A first reflector element 27 is arranged below the through hole 29, which deflects the light beam 24 in such a way that the light beam 24 is directed toward the free end of the swivel arm 18. The second reflector element 28, which deflects the light beam 24 vertically downwards, is arranged at the free end of the swivel arm 18 remote from the swivel axis 20. Optionally, an optical lens 30 can be provided in the light path between the end of the light guide 26, which is arranged adjacent to the swivel joint 19, and the second reflector element 28 for collimating the light beam. Instead of the optical lens 30, a camera lens can also be provided with which the degree of collimating of the light beam can be changed.

The first and/or second reflector element 27, 28 can be shaped in such a way, e.g. as a parabolic mirror or free-form mirror, so that it collimates the reflected light. Hereby it is not necessary to arrange an optical lens in the light path, or an optical lens with a low refractive power can be provided in the light path.

When the processing head 13 is moved by means of the swivel arm 18, the light guide 26 is only moved along the traverse 14 with its end arranged in the carriage 17. The swivel arm 18 can perform a rotating motion that has no influence on the position of the light guide 26. This makes it possible for the swivel arm 18 to perform one or more complete rotations without affecting the functionality of the light guide 26, as it is not entrained during such a rotating motion of the swivel arm 18.

With such an arrangement, a large number of processing heads 13 can be provided, each by means of a swivel arm on a carriage 17 that can be moved along the traverses 14, whereby it is ensured that the individual light guides 26 cannot become entangled with one another. This makes it easy to create a 3D printer 1, which has at least eight, preferably at least twelve and in particular at least sixteen processing heads, all of which can be simultaneously or almost simultaneously supplied with a light beam 24.

The light sources 25 can generate the light beam in nonstop operation (cw) or in pulsed operation (pw). In the case of a pulsed light source 25 with a high light intensity, it may also be expedient to assign a light source 25 to several processing heads 13, in which case a multiplexer is arranged between the light source 25 and the respective processing heads 13, so that the multiplexer is used to uniquely direct the light beam generated by the light source to one of the several processing heads 13. The change between the individual processing heads 13 can take place so quickly that the change is so quick compared to the melting or sintering process that the individual processing heads 13 coupled to it can be regarded as being acted upon almost simultaneously to a light beam 24.

A further embodiment of the swivel arm (FIG. 3*d*) comprises as light source a pumped laser with a light pump 32 and a resonator 33, which are connected to one another via a light guide 34. The resonator comprises an active medium, preferably consisting of a solid body, which is excited or pumped by means of pumped light 35 emitted by the light pump 32.

The resonator 23 together with the optical lens 23 is arranged directly at the end of swivel arm 18, remote from the swivel axis 20, in such a way that a light beam 24 can be emitted vertically downwards. The light pump 32 is arranged on the carriage 17 in such a way that it does not participate in the pivoting of the swivel arm. The light pump 32 usually comprises one or more semiconductor lasers and a heat sink with cooling fins. The light pump is much heavier than the resonator 33 and the optical lens 23. Since only the resonator 33 and the optical lens 23 are moved and not the light pump 32, the moment of rotary inertia of the swivel arm 18 is low.

In this embodiment, the light pump 32 is arranged on the carriage 17. However, the light pump 32 can also be arranged independently or remotely from the carriage 17.

This embodiment can also be modified in that a beam guide with reflector elements is provided instead of the light guide 34, as shown in FIG. 3*c*. The light guide 34 can either be omitted completely or guided only as far as the carriage 17 when the light pump is arranged remotely from the carriage 17.

A ND:YAG laser is preferably used as a pumped laser and one or more laser diodes with a wavelength of 808 nm as the light pump. However, another laser, such as a Yb:YAG laser, can also be provided.

In accordance with a further embodiment (FIG. 3*e*), a beam guide is formed from the light source 25 to the swivel arm 17 by means of a light guide 26. The light guide 26 is guided from the light source 25 to the swivel arm 18, the light guide 26 being arranged with its end remote from the light source 25 below the swivel arm 18 in the area of the carriage 17. The light guide 26 is connected to the swivel arm 18 in such a way that the light guide 26 is guided along the swivel arm in the area of the carriage 17 and its end remote from the light source 25 points to the free end of the swivel arm 18. A reflector element 28 is arranged at the free end of the swivel arm 18, which is designed as a mirror. However, the reflector element 28 can also be represented by other optical elements deflecting a light beam 2, such as a prism or the like.

A light beam 24 emitted by the light source 25 is transmitted by the light guide 26 and emitted at its end remote from light source 25 in such a way that the light beam 24 is deflected along the swivel arm 18 in the direction of the reflector element 28, preferably parallel to the swivel arm. The second reflector element 28 is arranged at the free end of the swivel arm 18 to deflect the light beam 24 downwardly onto the processing area. Optionally, an optical lens can be provided in the light path between the end of the light guide 26 and the reflector element 28 for collimating the light beam 24. Instead of the optical lens 30, a camera lens can also be provided in order to be able to change the degree of collimating of the light beam 24 and/or the reflector element 28 can be formed accordingly curved.

When moving the processing head 13 by means of the swivel arm 18, only the end of the light guide 26 remote from the light source 25 is carried along. In this embodiment, the swivel arm 18 can be particularly light, since only small loads have to be collected. An appropriately designed swivel arm 18 has only a low moment of rotary inertia, so that it can be swiveled quickly to any rotation position. The carriage 17 can also be moved very quickly due to the low weight of the swivel arm 18.

With such 18 an arrangement, a large number of processing heads 13 can thus each be provided by means of a swivel arm 18 on a carriage 17 that can be moved along the traverses 14, whereby it is ensured that the individual light guides 26 cannot become tangled with one another. This makes it easy to create a 3D printer 1, which has at least eight, preferably at least twelve and in particular at least sixteen processing heads 13, all of which can be simultaneously or almost simultaneously supplied to a light beam 24.

In the present embodiment example, the traverses 14 and thus also the swivel arms 18 attached to them are arranged at different levels (FIG. 1: middle traverse higher than the lateral traverses), so that the swivel arms 18 that are arranged on the middle traverse 14, cannot collide with the swivel arms 18, which are arranged on the outer traverses 14. The level of the swivel arms 18 can also be designed differently if all the traverses are arranged at the same height. This can be achieved, for example, by attaching the swivel joints 19 to the individual carriages 17 at different heights.

In the embodiment explained above, the traverses 14 are arranged in a stationary position. Within the scope of the invention, however, it is possible that the traverses can be moved horizontally and transversely to their longitudinal direction. However, such an embodiment of the movement device 12 requires a more complex control that the individual swivel arms 18 do not collide. Therefore, in principle, the arrangement with stationary traverses 14 is preferred. Such an embodiment of the movement device 12 allows for easy scaling of the 3D printer, for example, by adding additional carriages on the existing traverses or by attaching one or more additional traverses to increase the production speed.

In the embodiment explained above, the swivel arms 18 are not adjustable in the vertical direction. Within the scope of the invention, however, it is possible either to provide a device on the carriage 17 for adjusting the vertical position of the swivel arm 18, or to make the traverses 14 and/or the entire movement device 12 adjustable in the vertical position. This can be particularly useful in order to provide sufficient space for the movement of the scraper 9 between the powder bed 3 and the swivel arms 18 when the powder bed 3 is being scraped by the scraper 9, and after the scraper 9 is again outside the area of the powder bed 3, the swivel arms 18 can be lowered in order to be as close as possible to the surface of the powder located in the powder bed 3 with the processing heads 13.

The light sources 25 for the individual processing heads 13 can be designed identically and each generate a light beam with the same intensity and frequency or frequency range. However, within the scope of the invention it is also possible to provide different light sources for the different processing heads, with which light is emitted with different frequencies or frequency ranges and/or with different intensities. Light sources can also be provided with which the wavelength of the light can be tuned over a certain range. Such frequency-tunable lasers are known and usually have a semiconductor amplifier.

An advantage of the present invention is that different places of powder 11 located in the powder bed 3 can be simultaneously exposed to light and thus heat by the multiple processing heads 13 and simultaneously melted or sintered. This parallelizes the manufacturing process and speeds it up significantly compared to conventional 3D printers. A 3D component 31 (FIG. 1) can thus be produced very quickly.

The processing heads 13 can be positioned very precisely over the powder bed 3, which enables high-precision 3D components to be produced.

The movement device 12 for the processing heads 13 is designed very simply and can be produced much more cost-effectively compared to 3D printers with similar performance.

A first version of a second embodiment is explained below. Like the first embodiment, the second embodiment comprises a process chamber 2, a powder bed 3, a scraper 9 and at least one processing head 13. Identical parts of the second embodiment are identified with the same reference sign as in the first embodiment. The above explanations apply to identical parts, unless otherwise stated below. The process chamber 2 can comprise a device for supplying an inert gas atmosphere to prevent oxidation of powder 11 during component manufacturing.

A processing table 36 with a table plate 37 is provided in the process chamber 2. The processing table 36 comprises heating-cooling channels 38 for tempering the table plate 37, also called the support surface, to a desired temperature. By tempering the table plate 38, stresses in the component, in particular in the first component layers, can be reduced or completely relieved or prevented.

In the process chamber 2, the processing head 13 is provided on a movement device 12 (not shown in FIG. 4) in the same way as in the first embodiment, in order to direct a light beam 24 onto the processing table 36. However, the processing head 13 can also be arranged in a stationary position and with a deflection device, which e.g. has two movable mirrors, the light beam emitted by the processing head can be directed to any point in the powder bed 3.

Instead of a single processing head 13, a movement device 12 with several processing heads 13 can also be provided, as shown in FIGS. 1 to 3*d*.

An application dispenser 39 is provided in the process chamber, which comprises a storage chamber 40 for powder 11 and a closable application opening 41 through which the powder 11 can leave the storage chamber 40 for application on the processing table 36. The application dispenser 39 has a scraper 9 for smoothing the powder 11 applied to the powder bed 3.

The processing table 36 is surrounded by a wall 42 in the horizontal direction. The wall 42 encloses the table plate 37 of the processing table 36 with little clearance.

The wall 42 is connected to a foundation 44 of the 3D printer 1 via several lift cylinders 43. The lift cylinders 43 can adjust the height of the wall 42 in the vertical direction relative to the processing table 36. The wall 42 can thus protrude upward a bit from the side of the processing table 36, thereby delimiting a cavity that forms the powder bed 3. The processing table 36 can be connected to the foundation 44 by means of dampers to reduce or prevent the transfer of shocks and vibrations to the processing table 36.

The application dispenser 39 is coupled to a movement mechanism (not shown) that allows the application dispenser 39 to be moved horizontally across the processing table 36 and thus parallel to the table plate 37 of the processing table 36. The movement mechanism of the application dispenser 39 is coupled to the wall 42 in such a way that the movement mechanism is raised or lowered together with the wall 42. As a result, a lower edge 45 of the scraper 9 is always at the level of an upper edge 46 of the wall 42.

The height adjustment of the wall 42 can be coupled with other components in the process chamber. Thus, the processing head 13 can also be moved together with the wall 42. The vertical distance between the processing table 36 and the processing head 13 or between the processing head 13 and the wall 42 remains constant for each component layer to be manufactured. Therefore, the light beam 24 does not have to be refocused on the production level before each production of another component layer. The process control of component production can be accelerated by this.

The wall 42 can be provided at its upper edge with a collar 47 projecting horizontally out-wards, which prevents powder from falling onto the bed-plate in areas not intended for it. The collar 47 can be provided on only one side of the powder bed 3, or it can be formed on several or even circumferentially.

A collection device, designed as a collection basin 48, is arranged around the processing table 36 or around the collar 47, in order to collect excess powder 11, which, for example, is swept by the scraper 9 from the processing table 36 or from the collar 47. The collection basin 48 is connected to an extraction system 49, which feeds the collected powder 11 to a filter 50. Particles above a certain particle size are retained in the filter 50, for example particles with a particle size of more than 120 μm. Particles to be filtered out accordingly can be, for example, dirt particles or powder particles that are already bonded to each other. The powder material filtered in the filter 50 is then fed via a supply line 51 to the application dispenser 39 for reuse. In this way, a recirculating loop is created, through which excess powder 11 can be reused, thereby achieving a material saving.

In this embodiment, the processing table 36 can be designed to be particularly simple and thus cost-effective, since the processing table 36 does not have to be moved. In the generative production of components, the processing table 36 must be designed to carry high loads due to the high material density. For example, if the processing table has a support surface of 1.5 m×1 m and a stroke of 0.5 m, this results in an operating volume of 0.75 $m^3$. If this operating volume is filled with aluminum powder, then the content weighs approximately 2 t. In the case of steel powder, the weight is approximately 6 t. The components to be moved, such as the wall 42 and, if necessary, other components (application dispenser 39, scraper 9, processing head 13), are significantly lighter than a processing table 36 with a large operating volume. Therefore, it is possible to process these components with a significantly smaller dimensioned drive, which can reduce the acquisition costs as well as the operating costs. At the same time, the structure of the 3D printer 1 is also simplified.

FIG. 4 shows the process chamber 2 at the beginning of the generative production of a component. To apply the powder 11 to the processing table 36, the application dispenser 39 moves in the direction of movement 10 over the entire processing table 36. The applied powder 11 is smoothed by the squeegee 9. Subsequently, the first component layer can be formed by a light beam 24. After the first component layer is formed, the wall 42 is moved upward by the height of the first component- or powder layer. The application dispenser 39 is moved upwardly coupled to the wall 42 by the same height. Subsequently, the aforementioned steps are repeated until the component is fully manufactured. The wall 42, together with the processing table 36, forms a powder bed 3 that increases in height.

The wall 42 can be moved depending on the thickness of the next component layer to be formed. It is possible that the component layers each have different thicknesses. For example, individual component layers can be thicker than others during production if high molding accuracy is not required in the corresponding component areas. In this way, component production can be accelerated in individual component areas and thus also be particularly fast overall. If, on the other hand, high molding accuracy is required in individual component areas, the component layer to be manufactured can have a smaller thickness. The component can thus be manufactured particularly quickly depending on the dimensional accuracy required in the respective areas.

According to a second variation of the second embodiment, the movement device 12 for the processing head(s) 13 can be mechanically decoupled from the wall 42, so that both can be moved independently of each other (FIG. 5). The processing heads 13 are each connected to a traverse 14 via a swivel arm 18, a swivel joint 19 and a carriage 17. In contrast to the first embodiment, a vertical movement device is provided on the carriage 17, so that the processing head is arranged to be movable in the vertical direction. In FIG. 5, only a single processing head 13 is shown for simplified visual representation.

The processing head 13 comprises an optical lens 23 to focus the light beam 24 emitted by it onto the surface of the powder bed. Three distance sensors 52 are stationary arranged in the process chamber 2. The distance sensors 52 are designed for electro-optical distance measurement between the distance sensors 52 and the processing head 13. For measuring the distance between the distance sensors 52 and the processing head 13, a reference element 53, for example a reflector, in particular a prism reflector, for optical beams is arranged on the processing head 13.

The distance sensors 52 are arranged in a stationary but pivotable manner in the process chamber 2, so that a respective optical beam 54 emitted by the distance sensor 52 can be tracked to the reference element 53. The distance sensors 52 are connected to a control and regulation device 55. From the three measured distances between the processing head 13 and the three distance sensors 52, the spatial position of the processing head 13 can be precisely determined. With the aid of the control and regulation device 55, the processing head 13 can be moved precisely to a desired position in the three-dimensional space. The positioning of the processing head 13 is controlled by the distance measurements.

This makes it possible to decouple the movement of the processing head 13 from the movement of the wall 42 and nevertheless to focus the emitted light beam 24 exactly on the surface of the powder bed.

Preferably, one or more reference elements 53 are provided on the wall 42, in particular its upper edge, which can be scanned by the distance sensors to determine the height of the wall 42. This allows the relative position of the processing head(s) 13 and the wall 42 to be detected.

Instead of detecting the height of the wall 42, the height of the powder bed 3 can also be scanned with a suitable sensor. Then the processing heads 13 can be aligned directly with the height of the powder bed 3.

The drive with which carriage 17 and swivel joint 19 are moved is controlled by the control and regulation device 55 depending on the current position of processing head 13. For this purpose, the processing head 13 can be moved slower the closer it gets to its required position. In this way, even with an inexpensive and in itself not very accurate movement device 12, the processing head 13 can be transferred precisely to a required position, whereby the accuracy of the position is determined solely by measuring the distance by means of the distance sensors 52. The overall costs of the 3D printer 1 can be reduced, since the distance sensors 52 are inexpensive and, at the same time, a less expensive movement device 12 or a less expensive drive can be used.

The setup shown in FIG. 5 for controlling and regulating a processing head 13 can also be used to precisely position other components, such as a scraper 9, an application dispenser 39, a wall 42 or any other moving component with the aid of a servo loop.

In the second embodiment, optical distance sensors 52 are used to measure the distances between the reference elements 53 and the distance sensors 52. Such distance sensors 52 are inexpensive and have a very high resolution. They can use triangulation to determine the distance to reference element 53. With triangulation, on optical light beam, for example a laser beam, is focused on the measurement object and observed with a camera, a spatially resolving photodiode or a CCD line located next to it in the distance sensor 52. If the distance between the measuring object and the sensor changes, the angle at which the light point is observed also changes, and thus the position of its image on the photo receiver. From the change in position, the distance of the object from the laser projector is calculated using the angle functions. Distance measurement by triangulation is very simple and inexpensive. If the accuracy requirements are low, the radiation of a light emitting diode can also be used as a light beam.

The distance measurement can also be performed by measuring the phase position. When measuring the phase position, an optical beam 54, for example a laser beam, is emitted. The phase shift of the reflected laser beam compared to the emitted beam depends on the distance. This phase shift can be measured and used to determine the distance traveled. Distance measurement by means of measuring the phasing has a high accuracy.

In a distance measurement using operating time, a short pulse of light, a constant light beam or a modulation of light is emitted. The pulse operating time is the time required for the light beam to move from the source to a reflector and back to the source again. By measuring this operating time, the distance between the source and the object can be determined via the speed of light.

Sensors that can scan lines or surfaces or planes, such as stereo cameras for three-dimensional localization of one or more objects, can also be used for distance measurement. Due to the large recording range, corresponding sensors do not have to be designed to swivel.

The aforementioned distance sensors 52 are manufactured and sold, for example, by the company Micro-Epsilon.

Instead of optical sensors, other sensors, such as ultrasonic sensors or sensors that determine the distance by means of the operating time of radio waves, can be used.

Regardless of the type of sensor, the advantage is that the position of the processing heads can be set very precisely due to the servo loop. This can also be used to determine the position of the processing heads that can only be moved in one plane, according to the first embodiment.

For precise positioning, the actual position of the moving component, for example the processing head 13, can be detected after the start (FIG. 6). For this purpose, the distance between the processing head 13 and the respective distance sensor 52 can be measured. The actual position is detected by measuring the distance with the aid of the distance sensors 52 from FIG. 5. From the three distance measurements, the actual position of the processing head can be determined in a simple manner. If the actual position corresponds with the required position, no further action is required and component production can be continued.

The position of the movable component, for example the processing head 13, can be determined absolutely in the space. However, the position of the movable component can also be determined relative to another component. In the latter case, the distance between the two components is determined.

The actual position of the movable component can be controlled in each spatial direction or with respect to each axis individually and successively until the required position is reached. However, it is also possible to control the position of the movable component in all three spatial directions or with respect to all axes simultaneously.

The distance sensors 52 can be arranged stationary in the process chamber 2 of the 3D printer 1, for example, the distance sensors 52 can be connected to the foundation 44 of the 3D printer 1 via a carrier. The distance sensors 52 can determine the position of the surface of the powder bed 3 by means of a distance measurement and subsequently determine the position of a movable component, for example a processing head 13, by means of another distance measurement. The processing head 13 can be moved to a required position depending on the position of the powder bed 3, i.e. the height of the powder bed 3, in order to set a required distance between the processing head 13 and the surface of the powder bed 3. The movement of one or more processing heads 13 into their required position can be carried out in this case with the aid of the control and regulating device 55 described above. It is also possible that one or more distance sensors 52 are connected to or arranged on a processing head 13 and the distance between the processing head 13 and the powder bed surface is determined directly in order to subsequently move the processing heads 13 to a required distance from the surface of the powder bed 3.

If the actual position does not correspond to the required position, the position of processing head 13 is then modified. For this purpose, a drive can be started and the traversing speed of the processing head 13 can be set depending on the distance between the actual position and the required position. The smaller the distance between the actual position and the required position, the lower the movement speed can be selected. After a specified unit of time and/or a defined distance traveled, the actual position can be detected again and then modified if necessary. It is also possible to record the actual position continuously. Thus a closed servo loop can be created. By means of this servo loop, it is possible to transfer the processing head 13 precisely to a required position with a simple, inexpensive and, in itself, not very accurate movement device 12. The accuracy of the positioning is determined solely by the distance measurement by the distance sensors 52.

In addition, it is also possible for the position of the processing heads 13 to be set as a function of the position of the movable wall 42, in particular a top edge and/or a horizontal surface. For this, at least one distance sensor 52 can be connected to the processing heads 13 or arranged in a stationary manner in the 3D printer 1.

Instead of the position of one or more processing heads 13, the position of a traverse 14 or another component of a direction of movement 12, for example a carriage 17, can also be determined and positioned relative to the movable wall 42 or surface of the powder bed 3. For this purpose, the traverse 14 can comprise one or more distance sensors 52 and measure the distance to the surface of the powder bed 3.

A scraper 9 can also be positioned relative to the powder bed surface or a movable wall 42 in the same way. One or more distance sensors 52 can then be connected to the scraper 9 and/or be stationary in the process chamber 2.

It is also possible to position an application dispenser 39 as a function of the position of the movable wall 42 or the surface of the powder bed 3. For this purpose, the application dispenser 39 comprises at least one distance sensor 52 and/or at least one distance sensor 52 can be arranged stationary in the process chamber 2 of the 3D printer 1.

The movable wall 42 can also be moved relative to the surface of the powder bed 3, for example to a position that is higher than the powder bed 3 by a layer thickness. For this purpose, it is advantageous if the distance sensors 52 are arranged stationary in the process chamber 2 and determine the distance between the movable wall 42 and the surface of the powder bed 3.

In addition, it is also possible to move a supply cylinder 4 relative to a processing table. In known 3D printers 1, the processing table 36, designed as a production piston 7, can also be moved in a controlled manner. For example, after a component layer has been completed, the production piston can be lowered by a defined layer thickness in order to be able to apply a new powder layer. The distance sensors 52 are then preferably arranged stationary in process chamber 2 of the 3D printer 1.

Several movable components can also be moved together in a coupled manner. For example, a scraper 9 with one or more processing heads 13 and/or together with an application dispenser 39 can be positioned in a controlled manner at a distance from the surface of the powder bed 3 required in a vertical direction. The vertical distance between the scraper 9 and the processing heads 13 and/or the application dispenser 39 is then the same at all times.

A further variation of a third embodiment is explained below. Identical parts of the third embodiment are identified with the same reference sign as in the first and second embodiment. The above explanations apply to identical parts, unless otherwise stated below.

In process chamber 2, a glass plate 56 is arranged horizontally as table plate 37 of the processing table 36. Below the glass plate bed 56, a movement device 12 is provided for moving a large number of processing heads 13.

The movement device 12 comprises three traverses 14, which extend below the glass plate 56. The traverses 14 are arranged parallel to each other. In the present embodiment, the middle traverse 14 is arranged slightly lower than the two outer traverses 14.

As described in FIGS. 1 and 2, the movement device 12 comprises two carriages 17 on each traverse 14, each with a swivel arm 18. At least one processing head 13 is arranged on each of the swivel arms 18. The swivel arm 18 can be designed as shown in FIGS. 3*a*-3*d*.

A support body 57 is arranged above the glass plate in the process chamber 2, on the bottom side 58 of which the component is manufactured. The first component layer is formed on the rear side 58 and can be connected to the support body 57. The support body is movable or adjustable together with the component 31 in the vertical direction of movement 59. For this purpose, a lifting device 60 may be provided for gripping and lifting the component 31.

For the generative production of a 3D component 31, powder 11 can be deposited by an application dispenser 39, not shown in FIG. 6, only on the entire glass plate 56. The glass plate serves as a support surface for the powder 11. The powder can be smoothed by a scraper 9 not shown in FIG. 6, whereby a powder layer 61 is formed. The support body 57 is then placed on the powder 11. Subsequently the powder 11 is selectively melted or sintered with the aid of the light beams 24 emitted by the processing heads 13 and bonded to form a component layer. The component layer can then be bonded to the support body. The component layer is then lifted together with the support body 57. The lifting device 60 can be used to support the gripping and lifting of the component layer. The unused powder 11 can then be removed from the glass plate 56 to prevent individual powder particles that are bonded together from being used in the production of the next component layer. The application dispenser 39 can then again deposit powder 11 onto the glass plate and a new powder layer 61 can be formed. The component is then deposited on the new powder layer 61. The powder material is melted or sintered, forming a new component layer that is simultaneously bonded to the previous component layer. The above steps are repeated until the component 31 is completely manufactured. The component 31 is manufactured in this way from top to bottom.

REFERENCE LIST

| | |
|---|---|
| 1 | 3D printer |
| 2 | Process chamber |
| 3 | Powder bed |
| 4 | Supply cylinder |
| 5 | Supply piston |
| 6 | Piston/cylinder unit |
| 7 | Production piston |
| 8 | Piston/cylinder unit |
| 9 | Scraper |
| 10 | Direction of movement |
| 11 | Powder |
| 12 | Movement device |
| 13 | Processing head |
| 14 | Traverse |
| 15 | Longitudinal side surface |
| 16 | Rail profile |
| 17 | Carriage |
| 18 | Swivel arm |
| 19 | Swivel joint |
| 20 | Swivel axis |
| 21 | Light guide |
| 22 | End |
| 23 | Optical lens |
| 24 | Light beam |
| 25 | Light source |
| 26 | Light guide |
| 27 | Reflector element |
| 28 | Reflector element |
| 29 | Passage opening |
| 30 | Optical lens |
| 31 | 3D component |
| 32 | Light pump |
| 33 | Resonator |
| 34 | Light guide |
| 35 | Pumping light |
| 36 | Processing table |
| 37 | Table plate |
| 38 | Heating-cooling channel |
| 39 | Application dispenser |
| 40 | Storage chamber |
| 41 | Application opening |
| 42 | Wall |
| 43 | Lift cylinder |
| 44 | Foundation |
| 45 | Lower edge |
| 46 | Edge |
| 47 | Collar |
| 48 | Collection basin |
| 49 | Extraction system |
| 50 | Filters |
| 51 | Supply line |
| 52 | Distance sensor |
| 53 | Reference element |
| 54 | Beam |
| 55 | Control and regulation device |
| 56 | Glass plate |
| 57 | Support body |
| 58 | Rear side |
| 59 | Direction of movement |
| 60 | Lifting device |
| 61 | Powder layer |

The invention claimed is:

1. A device for generative production of components by selective melting or sintering, the device comprising:

one or more light sources, each configured to generate a light beam, and several processing heads, wherein each of the processing heads is either coupled to a respective light source of the one or more light sources with a beam guide so that a respective light beam generated by the one or more light sources is guided to each processing head, or a respective light source of the one or more light sources is arranged directly on each processing head so that a respective light beam can be directed from each processing head onto a processing area, wherein each processing head is movably mounted by being arranged on a respective swivel arm on a respective carriage, which can be moved along a traverse, so that a respective light beam for each processing head can be directed to different locations in the processing area, and each swivel arm is configured such that the swivel arm is pivotable only around a respective vertical swivel axis.

2. The device according to claim 1, wherein the swivel arms are formed with a length of at least 5 centimeters (cm).

3. The device according to claim 1, wherein at least along the swivel arms the beam guide for the respective light beam is formed by means of reflector elements.

4. The device according to claim 1, wherein each swivel arm is made of plastic and/or a reflector element is provided at each end remote from the respective swivel axis for directing the respective light beam onto the processing area.

5. The device according to claim 1, wherein one of the one or more light sources or one resonator of a laser serving as a light source of the one or more light sources is arranged at a free end of each swivel arm remote from an axis of rotation.

6. The device according to claim 1, wherein several beam guides are provided and are at least partially formed as light guides.

7. The device according to claim 1, wherein several traverses arranged parallel to each other and in one plane are provided.

8. The device according to claim 7 wherein the traverses are arranged in a stationary manner.

9. The device according to claim 1, wherein on each traverse at least two independently movable carriages are mounted, wherein each carriage holds a processing head.

10. The device according to claim 1, wherein several light sources comprise an array of light emitting diodes and/or semiconductor lasers and each light source is assigned to one or more processing heads.

11. The device according to claim 1, wherein a multiplexer is provided for distributing the light beam of one of the light sources to different beam guides, each of which leads to one of the processing heads.

12. The device according to claim 1, wherein a control device is provided, which is designed in such a way that several processing heads can be moved simultaneously and/or can have a light beam applied to them simultaneously.

13. The device according to claim 1, wherein a powder bed is provided, which forms the processing area.

14. The device according to claim 1, further comprising a stationary processing table with a horizontal table plate, which forms a supporting surface for a powder bed, wherein the processing table has a wall which is at least partially laterally limiting and adjacent to the table plate and wherein the table plate and the wall jointly define the processing area, wherein the wall is movable perpendicular to the table plate.

15. The device according to claim 14, wherein the wall is movable together with at least one light source and/or a processing head and/or a scraper and/or an application dispenser and/or a supply cylinder.

16. The device according to claim 14, wherein an application dispenser is provided for applying powder to be selectively melted or sintered to the table plate.

17. The device according to claim 1, wherein a collection device is provided in order to receive excess powder, which has passed out of the processing area.

18. The device according to claim 17, wherein an extractor and a filter are provided to extract, filter and reuse the excess powder.

19. The device according to claim 1, further comprising at least one distance sensor provided for electro-optical distance measurement.

20. The device according to claim 19, wherein the distance sensor is arranged in a stationary manner to measure the distance between the distance sensor and a movable component.

21. The device according to claim 20, wherein a control and regulating device is provided that is designed in such a way that the movable component can be moved into a required position as a function of the measured distance between the distance sensor and the movable component.

22. The device according to claim 19, wherein two distance sensors are provided for distance measurement between the distance sensors and a movable component to determine a spatial position of the movable component.

23. The device according to claim 19, wherein at least three distance sensors and at least two movable components are provided, wherein each movable component can be detected in any position by the at least three distance sensors for distance measurement.

24. The device according to claim 23, wherein three distance sensors for distance measurement are permanently assigned to each movable component.

25. The device according to claim 1, further comprising a glass plate, a surface of which forms a supporting surface for powder, wherein the processing area is located on the surface of the glass plate, and the several processing heads are below the glass plate and are provided for respective directing of the respective light beam for each processing head through the glass plate onto the processing area.

26. The device according to claim 1, wherein the swivel arm of each processing head is designed as a straight cantilever.

27. The device according to claim 1, wherein the swivel arm of each processing head is designed as a single-link cantilever.

28. The device according to claim 1, wherein the swivel arm of each processing head is designed as a single-piece cantilever.

29. The device according to claim 1, wherein the swivel arm of each processing head comprises a free end and is arranged at the carriage via a swivel joint, wherein the swivel joint is in a horizontal swivel joint plane, wherein the free end of the swivel arm is arranged below the swivel joint or the swivel joint plane.

30. The device according to claim 1, wherein the swivel arm of each processing head is arranged at the carriage via a swivel joint and comprises a free end and a swivel end facing the swivel joint, wherein the swivel arm is configured such that a light guide arranged at or in the swivel arm extends in a straight line between the swivel end and the free end.

31. The device according to claim 1, wherein the swivel arm of each processing head is arranged at the carriage via a swivel joint and comprises a free end and a swivel end facing the swivel joint, wherein the swivel arm of each of the processing heads comprises a constant cross section between the free end and the swivel end.

32. The device according to claim 1, wherein the swivel arm of each processing head is made hollow.

33. The device according to claim 1, wherein the swivel arm of each processing head is made of a hollow plastic pipe.

34. The device according to claim 1, wherein a light guide is guided through the swivel arm of each processing head via an open beam path.

35. The device according to claim 1, wherein a control is provided, which is configured to pivot the swivel arm of each processing head during action by a maximum swivel angle relative to the traverse of no more than 60°.

36. The device according to claim 1, wherein a plurality of gantries are provided, each comprising a plurality of the several processing heads and a plurality of swivel arms, and wherein the plurality of gantries are arranged at such a distance from one another that coverage areas of adjacent gantries of the plurality of gantries overlap.

* * * * *